Jan. 13, 1931.  F. P. FOULKE  1,788,946
SPEED CHANGING MECHANISMS
Filed Jan. 9, 1928
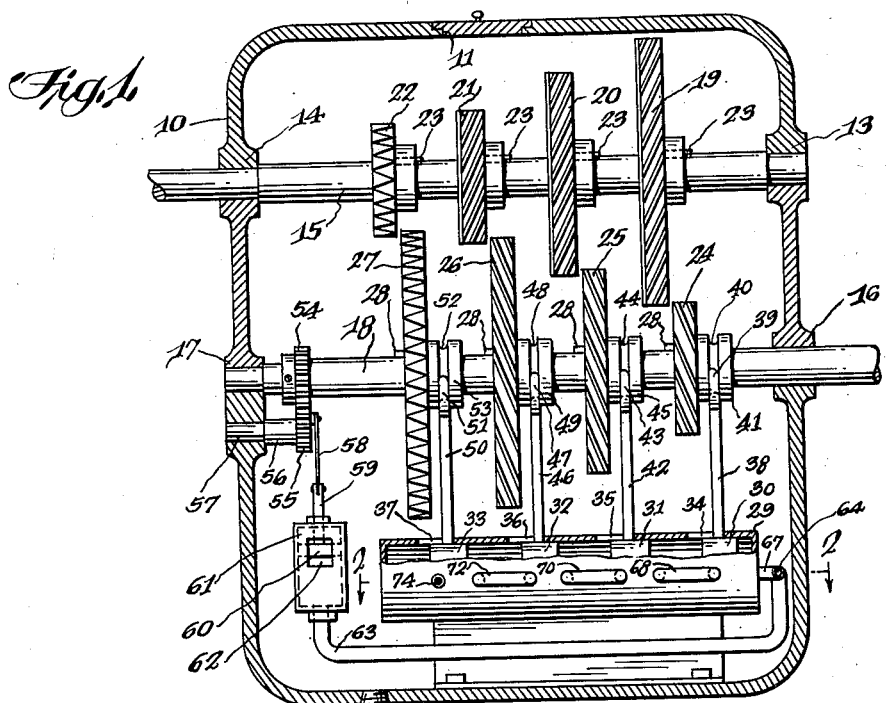
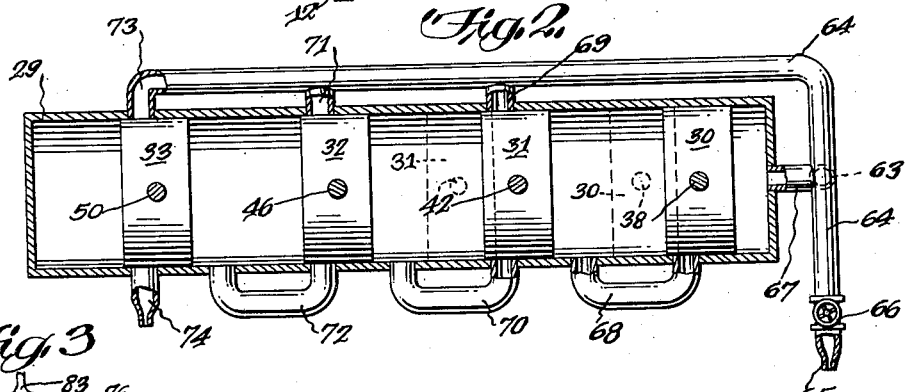
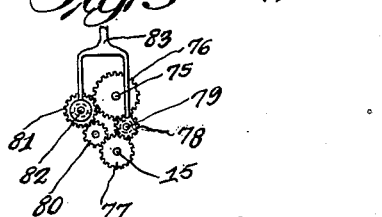
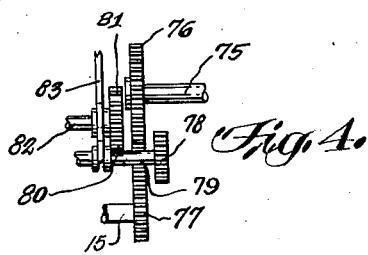
Frank P. Foulke
INVENTOR
BY Victor J. Evans
ATTORNEY Patented Jan. 13, 1931

1,788,946

UNITED STATES PATENT OFFICE

FRANK P. FOULKE, OF INDIANAPOLIS, INDIANA

SPEED-CHANGING MECHANISM

Application filed January 9, 1928. Serial No. 245,490.

This invention relates to certain novel improvements in speed changing mechanisms and particularly to such devices as are used on automotive vehicles and which are known in the art as transmissions.

The salient object of my invention is to provide a device of the foregoing character which will function automatically, that is one which will change the gear ratio between the power supplying and the power receiving shafts such that the ratio therebetween will be proportionate to the motor speed.

An object of the invention, ancillary to the foregoing, is to provide a mechanism of the foregoing character which will be hydraulically operated.

A further object of the invention is to provide a device of the foregoing character which will be simple in construction and positive in operation.

Other objects will appear hereinafter.

The invention consists in the novel combination and arrangement of parts to be hereinafter described and claimed.

The invention will be best understood by reference to the accompanying drawings, showing the preferred form of construction and in which;

Fig. 1 is a longitudinal vertical sectional view of a preferred form of construction for my invention;

Fig. 2 is a sectional detail view taken substantially on the line 2—2 on Fig. 1; and Figs. 3 and 4 are detail views depicting one form of construction employed for reversing the direction of rotation of the power output shaft.

In the drawings wherein the preferred embodiment of my invention is illustrated, 10 indicates a casing which has an opening 11 in the upper side thereof through which a suitable lubricating fluid such as oil may be introduced. A suitable drain plug 12 is provided in the lower side of the casing 10 to facilitate the draining thereof.

Aligned bearings 13 and 14 are provided in the casing 10 and the power receiving shaft 15 is journaled therein. Bearings 16 and 17 are also provided in the casing 10 and the power supplying shaft 18 is journaled therein. A plurality of gears 19, 20, 21, and 22 are fixedly mounted on the shaft 15 by means of the keys 23. Adapted to co-operate with the gears 19, 20, 21, and 22 are gears 24, 25, 26, and 27 which are mounted on the shaft 18 and which include keyways adapted to receive the key 28 so that the gears will be rotatable with shaft 18 and slidable therealong. The first set of gears which include gears 19 and 24 are the so called low speed gears, that is, the gear 24 is of smaller diameter than the gear 19. Each of these succeeding set of gears which include gears 20 and 25, gears 21 and 26, and gears 22 and 27, are arranged such that the gear on the power supplying shaft 18 is of increasing diameter while the gears on the power receiving shaft 15 are of gradually decreasing diameter and this construction is such that the gears 22 and 27 comprise the high speed set, that is the shaft 15 will be revolved much more rapidly when the gears 22 and 27 are meshed than when the gears 19 and 24 are meshed. The sets of gears intermediate to these two sets of gears will gradually increase the speed of the power receiving shaft as they are successively meshed subsequent to the meshing of the gears 19 and 24 and prior to the meshing of the gears 22 and 27.

The sets of gears are adapted to be automatically engaged in a step by step manner and the mechanism for accomplishing this is as follows. A cylinder 29 is mounted within the casing 10 in which pistons 30, 31, 32, and 33 are reciprocally mounted. In the upper side of the cylinder 29 a plurality of slots are provided which are disposed such that the slot 34 is aligned with the piston 30 and the slot 35 is aligned with the piston 31 and the slot 36 is aligned with the piston 32 and the slot 37 is aligned with the piston 33. A rod 38 is connected to the upper side of piston 30 and has a fork 39 on the upper end thereof which rides in the groove 40 on the collar 41 and is disposed around the shaft 18 and which is keyed to the gear 24. A rod 42 is connected to piston 31 and has a fork 43 thereon which rides in the groove 44 in the collar 45 and is disposed around shaft 18 and which is keyed to gear 25. A similar construction is provided for piston 32 and gear 26 which includes the rod 46, fork 47, groove 48 and collar 49. A similar construction is provided for the piston 32 and the gear 27 which includes a rod 50, fork 51, groove 52 and a collar 53.

Fixedly mounted on the shaft 18 in the position best illustrated in Fig. 1 is a gear 54 which meshes with a gear 55 and is mounted on shaft 56 which is journaled in the bearing 57 in the casing 10. Eccentrically connected to the outer face of the gear 55 is a connecting rod 58 which is connected to the pitman 59 which operates the piston 60 in the cylinder 61. The cylinder 61 has a port 62 formed in the wall thereof. The oil which is introduced into the casing 10 through the opening 11 is adapted to be of such a height as to engage the gears mounted on the shaft 18 such that said gears will run in the oil and will sling said oil to other parts of the mechanism whereby said other parts may be thoroughly lubricated.

In operation the shaft 18 is rotated in a manner to be described which will cause the piston 60 to force oil, admitted into the cylinder 61, through the port 62 through the conduit 63. The conduit 63 is directed to a conduit 64 which has a by-pass 65 arranged at one end thereof, passage to the by-pass 65 being controlled by the regulating valve 66. A conduit 67 is connected to conduit 64 and leads into cylinder 29 behind piston 30. Pressure exerted by the action of piston 60 on the oil will be transmitted through conduits 63, 64, and 57 into cylinder 29 behind piston 30 and will move said piston forwardly. Movement of piston 30 will be transmitted through rod 38 to gear 24 and will cause said gear to be moved into meshing engagement with gear 19. Therefore movement of shaft 18 will be transmitted to shaft 15. It is apparent that continued pressure will be exerted by the piston 61 on the oil as said shaft 18 revolves. Further, when piston 30 moves into its forward position which is shown in dotted lines in Fig. 2 it is apparent that the inlet to by-pass 68 is disclosed. Therefore the oil will flow from the area in back of piston 30 to the area behind piston 31 and the pressure exerted will cause the piston 31 to move forwardly to the dotted line position shown in Fig. 2. This will disclose the outlet 69 of conduit 64 and oil will be forced by piston 60 to enter the area behind piston 31. As said piston 31 is moved forwardly gear 25 will be caused to mesh with gear 20 which will tend to rotate shaft 15 at a greater speed than it is rotated by the meshing of gears 24 and 19. The teeth are cut in the gears 19, 20, and 21, and 24, 25, and 26 at an angle greater than 70 degrees. Therefore when gears 20 and 25 tend to speed up the travel of shaft 15 gears 24 and 19 will be forced apart. The forward movement of piston 31 discloses the inlet to by-pass 70 and permits the oil under pressure to enter the area behind piston 32 and will move said piston forwardly so as to disclose the outlet 71 from conduit 64. The forward movement of piston 32 will cause the meshing of gears 26 and 21 which will further speed up shaft 15 and will thus force gears 25 and 20 apart. The forward movement of piston 32 will disclose the inlet to by-pass 72 which will permit the oil under pressure to flow into the chamber behind piston 33 and cause said piston to be moved forwardly so as to disclose the outlet 73 of conduit 64. The oil under pressure will flow through this area and out through the outlet 74 which has a restricted opening as disclosed. The forward movement of piston 33 causes the meshing of gears 27 and 22 which as shown on the drawings have wedged shaped teeth. The meshing of these last two gears will cause shaft 15 to be rotated at its highest speed and will cause the parting of gears 21 and 26. The foregoing description describes the manner in which the speed of the shaft 15 is gradually increased in a step by step manner. Plates are provided on the inner side of gears 19, 20, and 21 to limit the movement of gears 24, 25, and 26 so as to prevent said last named gears completely passing through the first named gears.

Figs. 4 and 5 depict a construction by which I am enabled to control the direction of travel of the mechanism to be driven by shaft 15. A shaft 75 is provided which is adapted to be connected to a power receiving means such as the rear axle of an automobile and said shaft has a gear 76 mounted thereon. A gear 77 is mounted on the shaft 15. A gear 78 is mounted on the shaft 79 and when said gear is moved into position so as to mesh with gears 76 and 77 the shaft 75 is operated in one direction. An idler gear 80 is provided which is adapted to mesh with gear 77 at all times. A gear 81 on idler shaft 82 is adapted to mesh with both gears 76 and 80 to interconnect said gears. When these gears are meshed shaft 75 is operated in the opposite direction from that in which it operates when gear 78 meshes with said gears 76 and 77. A shifting fork 83 is provided which is adapted for either manual or automatic operation such as by magnet and which is actuated to cause meshing or disengaging of the gears 78 and 81. In Fig. 5 the fork 83 is shown in inoperative or neutral position. By moving the fork 83 in one direction gear 78 is meshed and by moving said fork in the opposite direction gear 81 is meshed and thus the direction of operation of shaft 75 is controlled. It is manifest that the gear 78 and the gear 81 will never be meshed with the gears they are adapted to engage at the same time and that these gears are employed so as to control the direction of rotation of the output shaft 75.

When either gear 78 or gear 81 is meshed in the manner described the motor (not shown) is started and until said motor attains a predetermined speed the device illustrated in Fig. 1 does not function the oil escaping through the by-pass 65, the magnitude of which is controlled by the valve 66. When the motor reaches a predetermined speed the piston 60 will exert a predetermined pressure and will actuate the piston 30 which will cause the meshing of gears in the manner described. Since the load will be thrown on the motor the speed thereof will be reduced but it will gradually pick up and when a predetermined speed is attained and therefore a predetermined pressure, the piston 31 will be operated and gears 20 and 25 will be meshed which will again cause a reduction in motor speed. When the motor speed again picks up to a predetermined amount gears 21 and 26 will be meshed and this operation will be carried out until the final set of gears have been meshed. It is to be understood that any desired number of sets of gears might be provided and the greater number of these sets the more gradual will be the step by step increase in speed.

In climbing a hill or under other conditions which will impress a great load on the motor it is possible that the motor speed may be reduced to such a point that the wedge shaped gears in the final stage will be separated. However, as soon as the motor speed again picks up the pressure will act on the piston 30 and will cause the meshing of the first set of gears and the device will continue to bring into play succeeding sets of gears until the proper ratio between the load and the motive power is attained.

It is apparent that it might be desirable to control the output of the by-pass 65. To take care of such a condition it is within the purview of my invention to provide a connection with the valve 66 which would be extended to the dash or other suitable point on the vehicle with which the transmission is associated. Therefore by proper manipulation of this connecting means the magnitude of the by-pass 65 might be controlled and therefore the operation of the transmission might be regulated to occur at different times. It is also apparent that it would be advantageous to close the by-pass 65 when the transmission is operating so as to eliminate waste of the fluid under pressure. This might also be accomplished by the above described mechanism.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variation and modifications as come within the scope of the appended claims.

Having thus described my invention what I claim as new and desire to protect by Letters Patent is:

1. In a device of the class described, a housing, a power supplying shaft extending from said housing, a power receiving shaft extending from said housing, a plurality of gears on said power supplying shaft, means for connecting said gears to said shaft for slidable movement thereon and rotatable movement therewith, a plurality of gears on said power receiving shaft, means for fixing said gears to said shaft, a cylinder in said housing, pistons in said cylinder defining compartments therein between each other, means for individually connecting said pistons to said gears on said power supplying shaft, means for disconnecting said gears, and means for directing a fluid under pressure to said compartments, said pistons controlling the operation of said last named means whereby said fluid will be successively directed to said compartments to successively motivate said pistons to successively engage the gears on said power supplying shaft with the gears on said power receiving shaft.

2. In a device of the class described, a housing, a power supplying shaft extending from said housing, a power receiving shaft extending from said housing, a plurality of gears on said power supplying shaft, means for connecting said gears to said shaft for slidable movement thereon and rotatable movement therewith, a plurality of gears on said power receiving shaft, means for fixing said gears to said shaft, a cylinder in said housing, pistons mounted in said cylinder in spaced apart relation to define compartments in said cylinder therebetween, means for individually connecting said pistons to said gears on said power supplying shaft, a pump structure in said housing, means for operating said pump structure, a conduit extending from said pump structure to the compartment of said cylinder in front of the first piston therein whereby a fluid under pressure forced through said conduit into said cylinder will move said piston to cause engagement of the gear connected thereto with a cooperating gear on said power receiving shaft, and means for directing the fluid from said pump successively to the compartments in front of each of the succeeding pistons whereby said pistons will be moved by the pressure of said fluid to successively cause engagement of the gears connected to said pistons with co-operating gears on said power receiving shaft, said gears having the teeth thereon arranged to disengage each other as succeeding gears are successively meshed.

3. In a device of the class described, a housing, a power supplying shaft extending from said housing, a power receiving shaft extending from said housing, a plurality of gears on said power supplying shaft, means for connecting said gears to said shaft for slidable movement thereon and rotatable movement therewith, a plurality of gears on said power receiving shaft, means for fixing said gears to said shaft, a cylinder in said housing, pistons mounted in said cylinder in spaced apart relation to define compartments in said cylinder therebetween, means for individually connecting said pistons to said gears on said power supplying shaft, means for disconnecting said gears, a pump structure in said housing, means for operating said pump from said power supplying shaft, a conduit extending from said pump to the compartment in said cylinder in front of the foremost piston therein whereby pressure impressed on said fluid by said pump will move said piston to cause engagement of the gear connected thereto with a co-operating gear on said power receiving shaft, said conduit having portions thereof extended beyond said named compartment and disposed for communication with the other of said compartments, another conduit extending from the compartment between the foremost and the second of said pistons and the compartment in front of said piston when said piston is moved, said conduit serving to conduct fluid from the compartment in front of said first named piston to the area between said first named and said second named pistons and from the portion of said first named conduit communicating with said last named compartment whereby the pressure impressed on said fluid may move said second named piston to cause engagement of the gear connected to said second named piston with a co-operating gear on said power receiving shaft, and other conduits similar to said second named conduit extending between the compartments between the successive pistons whereby the fluid may be transmitted to said compartments to operate said successive pistons to cause engagement of the gears connected thereto with co-operating gears on said power receiving shaft.

4. In a device of the class described, a housing, a power supplying shaft extending from said housing, a power receiving shaft extending from said housing, a plurality of gears on said power supplying shaft, means for connecting said gears to said shaft for slidable movement thereon and rotatable movement therewith, a plurality of gears on said power receiving shaft, means for fixing said gears to said shaft, a cylinder in said housing, pistons mounted in said cylinder in spaced apart relation to define compartments in said cylinder therebetween, means for individually connecting said pistons to said gears on said power supplying shaft, a pump structure in said housing, means for operating said pump from said power supplying shaft, a conduit extending from said pump to the compartment in said cylinder in front of the foremost piston therein whereby pressure impressed on said fluid by said pump will move said piston to cause engagement of the gear connected thereto with a co-operating gear on said power receiving shaft, said conduit having portions thereof extended beyond said named compartment and disposed for communication with the other of said compartments, another conduit extending from the compartment between the foremost and the second of said pistons and the compartment in front of said piston when said piston is moved, said conduit serving to conduct fluid from the compartment in front of said first named piston to the area between said first named and said second named pistons and from the portion of said first named conduit communicating with said last named compartment whereby the pressure impressed on said fluid may move said second named piston to cause engagement of the gear connected to said second named piston with a co-operating gear on said power receiving shaft, and other conduits similar to said second named conduit extending between the areas between the successive pistons whereby the fluid may be transmitted to said areas from preceding compartments and said first named compartment to operate said successive pistons to cause engagement of the gears connected thereto with co-operating gears on said power receiving shaft, said co-operating gears embodying an increasing ratio whereby as the successive gears are meshed said power receiving shaft will be operated at an increasing rate of speed, said gears having the teeth cut thereon at such an angle that as successive gears are meshed to increase the speed of said power receiving shaft the previously meshed set of gears will be disengaged by reason of the increased speed and the angle of the teeth thereon.

5. In a device of the class described, a housing, a power supplying shaft extending from said housing, a power receiving shaft extending from said housing, a plurality of gears on said power supplying shaft, means for connecting said gears to said shaft for slidable movement thereon and rotatable movement therewith, a plurality of gears on said power receiving shaft, means for fixing said gears to said shaft, a cylinder in said housing, pistons in said cylinder defining compartments therein between each other, means for individually connecting said pistons to said gears on said power supplying shaft, means for disconnecting said gears, and means for directing a fluid under pressure to said compartments, said pistons controlling the operation of said last named means whereby said fluid will be successively directed to said compartments to successively motivate said pistons to successively engage the gears on said power supplying shaft with the gears on said power receiving shaft, and means for by-passing said fluid until the pressure thereon attains a predetermined magnitude.

6. In a device of the class described, a housing, a power supplying shaft extending from said housing, a power receiving shaft extending from said housing, a plurality of gears on said power supplying shaft, means for connecting said gears to said shaft for slidable movement thereon and rotatable movement therewith, a plurality of gears on said power receiving shaft, means for fixing said gears to said shaft, a cylinder in said housing, pistons mounted in said cylinder in spaced apart relation to define compartments in said cylinder therebetween, means for individually connecting said pistons to said gears on said power supplying shaft, a pump structure in said housing, means for operating said pump from said power supplying shaft, a conduit extending from said pump to the compartment in said cylinder in front of the foremost piston therein whereby pressure impressed on said fluid by said pump will move said piston to cause engagement of the gear connected thereto with a co-operating gear on said power receiving shaft, said conduit having portions thereof extended beyond said named compartment and disposed for communication with the other of said compartments, another conduit extending from the compartment between the foremost and the second of said pistons and the compartment in front of said piston when said piston is moved, said conduit serving to conduct fluid from the area in front of said first named piston to the compartment between said first named and said second named pistons and from the portion of said first named conduit communicating with said last named compartment whereby the pressure impressed on said fluid may move said second named piston to cause engagement of the gear connected to said second named piston with a co-operating gear on said power receiving shaft, other conduits similar to said second named conduit extending between the compartments between the successive pistons whereby the fluid may be transmitted to said compartments from preceding compartments and said first named conduit to operate said successive pistons to cause engagement of the gears connected thereto with co-operating gears on said power receiving shaft, said co-operating gears embodying an increasing ratio whereby as the successive gears are meshed said power receiving shaft will be operated at an increasing rate of speed, said gears having the teeth cut thereon at such an angle that as successive gears are meshed to increase the speed of said power receiving shaft the previously meshed set of gears will be disengaged by reason of the increased speed and the angle of the teeth thereon, and means for by-passing said fluid until the pressure thereon attains a predetermined magnitude.

In testimony whereof I affix my signature.

FRANK P. FOULKE.